(12) United States Patent
Moriya et al.

(10) Patent No.: US 11,371,616 B2
(45) Date of Patent: Jun. 28, 2022

(54) MECHANICAL SEAL

(71) Applicant: EAGLE INDUSTRY CO., LTD., Tokyo (JP)

(72) Inventors: Osamu Moriya, Tokyo (JP); Koji Sato, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 79 days.

(21) Appl. No.: 16/612,754

(22) PCT Filed: May 8, 2018

(86) PCT No.: PCT/JP2018/017689
§ 371 (c)(1),
(2) Date: Nov. 11, 2019

(87) PCT Pub. No.: WO2018/207747
PCT Pub. Date: Nov. 15, 2018

(65) Prior Publication Data
US 2020/0166141 A1 May 28, 2020

(30) Foreign Application Priority Data
May 12, 2017 (JP) .............................. JP2017-095988

(51) Int. Cl.
*F16J 15/36* (2006.01)
*F16J 15/34* (2006.01)

(52) U.S. Cl.
CPC ......... *F16J 15/363* (2013.01); *F16J 15/3448* (2013.01); *F16J 15/36* (2013.01)

(58) Field of Classification Search
CPC .... F16J 15/3448; F16J 15/3452; F16J 15/348; F16J 15/36; F16J 15/363
See application file for complete search history.

(56) References Cited

U.S. PATENT DOCUMENTS 1,876,520 A    9/1932  Newkirk et al.
5,947,479 A *  9/1999  Ostrowski ............ F16J 15/3452
                                                    277/306
(Continued)

FOREIGN PATENT DOCUMENTS

CN    201827376 U    5/2011
CN    201943995 U    8/2011
(Continued)

OTHER PUBLICATIONS

Chinese Office Action dated Aug. 17, 2020 (corresponding to CN201880031068.2).

(Continued)

*Primary Examiner* — Nicholas L Foster
(74) *Attorney, Agent, or Firm* — Harness, Dickey & Pierce, P.L.C.

(57) ABSTRACT

A mechanical seal capable of eliminating the need for an elastic body includes a metallic sleeve 120 fixed to a rotary shaft 500 and a metallic rotary ring 110 fixed to the sleeve 120. A metallic cartridge 220 is fixed to a housing 600. A metallic fixed ring 210 is configured to slide on an end surface of the rotary ring 110. A metallic bellows 230 presses the fixed ring 210 toward the rotary ring 110, wherein the rotary ring 110 and the sleeve 120 are connected to each other by an annular first connecting part, whereby a radially inner side region and a radially outer side region are separated from each other, one end of the bellows 230 and the fixed ring 210 are connected to each other by an annular second connecting part.

2 Claims, 1 Drawing Sheet

(56) References Cited

U.S. PATENT DOCUMENTS

| | | | |
|---|---|---|---|
| 6,007,069 A | 12/1999 | Sadowski | |
| 6,145,841 A | 11/2000 | Maeda | |
| 6,338,489 B1* | 1/2002 | Nakano | F16J 15/363 277/385 |
| 9,581,248 B2* | 2/2017 | Itadani | F16J 15/34 |
| 11,187,326 B2* | 11/2021 | Moriya | F16J 15/348 |
| 2003/0006560 A1* | 1/2003 | Dahlheimer | F16J 15/363 277/389 |
| 2013/0161912 A1* | 6/2013 | Sauter | F16J 15/348 277/500 |
| 2015/0211638 A1 | 7/2015 | Itadani et al. | |
| 2016/0230892 A1* | 8/2016 | Yoshino | F16J 15/348 |
| 2016/0281856 A1 | 9/2016 | Itadani et al. | |
| 2018/0106378 A1* | 4/2018 | Itadani | F16J 15/348 |
| 2020/0200275 A1* | 6/2020 | Moriya | F16J 15/34 |

FOREIGN PATENT DOCUMENTS

| | | |
|---|---|---|
| CN | 204099601 U | 1/2015 |
| CN | 104379974 A | 2/2015 |
| EP | 2416037 A1 | 2/2012 |
| EP | 2853788 A1 | 4/2015 |
| GB | 1007552 A | 10/1965 |
| GB | 2229777 A | 10/1990 |
| JP | S49-146358 U | 12/1974 |
| JP | S63-053959 U | 4/1988 |
| JP | H04-088565 U | 7/1992 |
| JP | H10-193101 A | 7/1998 |
| JP | 2000-074226 A | 3/2000 |
| JP | 2000-135569 A | 5/2000 |
| JP | 2008-240837 A | 10/2008 |
| WO | 2014/054745 A1 | 4/2014 |

OTHER PUBLICATIONS

Extended European Search Report dated Dec. 18, 2020 (corresponding to EP 18798735.9).

Japanese Office Action dated Feb. 1, 2022 with English translation (corresponding to JP2019-517619).

* cited by examiner

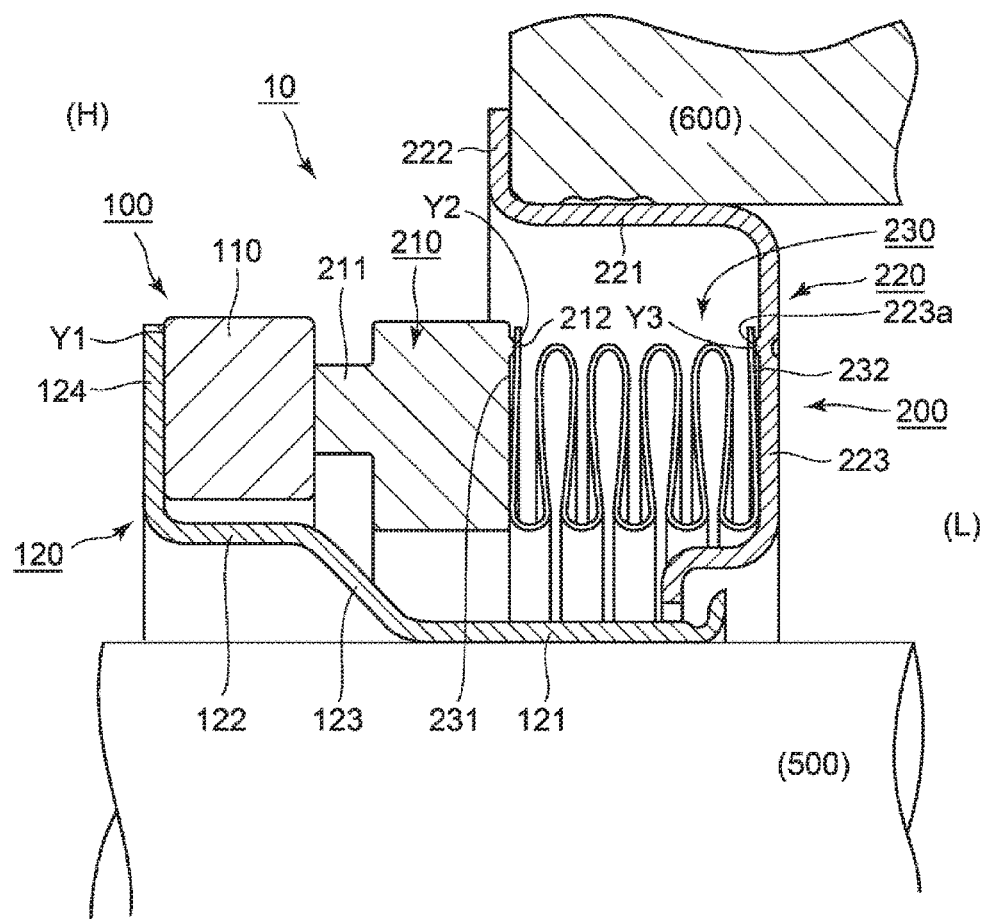

MECHANICAL SEAL

CROSS-REFERENCE TO RELATED APPLICATIONS

This application is a National Stage of International Application No. PCT/JP2018/017689, filed May 8, 2018 (now WO 2018/207747A1), which claims priority to Japanese Application No. 2017-095988, filed May 12, 2017. The entire disclosures of each of the above applications are incorporated herein by reference.

FIELD

The present disclosure relates to a mechanical seal for sealing an annular gap between a rotary shaft and a housing.

BACKGROUND

A mechanical seal includes a rotary ring and a fixed ring. The rotary ring and the fixed ring are made of a hard material such as SiC, carbon, or metal. In order to fix the rotary ring in a state where the rotary ring is positioned with respect to a rotary shaft and to obtain sealing performance, a gasket made of an elastic body such as rubber is generally used. In addition, in order to fix the fixed ring in a state where the fixed ring is positioned with respect to a housing and to obtain sealing performance, a gasket made of an elastic body such as rubber is used in a similar manner.

However, a gasket made of an elastic body such as rubber may fatigue (plastically deform) over time. This is likely to occur under a condition with a large variation in environmental temperature. In addition, depending on a sealed fluid, the gasket may deteriorate more readily or may even become unusable. Furthermore, the gasket and the rotary ring may slide on each other and sealing performance may decline.

CITATION LIST

Patent Literature

[PTL 1] Japanese Patent Application Laid-open No. 2000-74226
[PTL 2] WO 2014/54745

SUMMARY

Technical Problem

An object of the present disclosure is to provide a mechanical seal capable of eliminating the need for an elastic body such as rubber.

Solution to Problem

In order to solve the problem described above, the present disclosure adopts the following means.

Specifically, a mechanical seal according to the present disclosure is a mechanical seal for sealing an annular gap between a rotary shaft and a housing having a shaft hole into which the rotary shaft is to be inserted, the mechanical seal including: a metallic sleeve fixed to the rotary shaft; a metallic rotary ring fixed to the sleeve; a metallic annular member fixed to the housing; a metallic fixed ring configured to slide on an end surface of the rotary ring; and a metallic bellows pressing the fixed ring toward the rotary ring, wherein the rotary ring and the sleeve are connected to each other by an annular first connecting part, whereby a radially inner side region and a radially outer side region are separated from each other, one end of the bellows and the fixed ring are connected to each other by an annular second connecting part, whereby a radially inner side region and a radially outer side region are separated from each other, and another end of the bellows and the annular member are connected to each other by an annular third connecting part, whereby a radially inner side region and a radially outer side region are separated from each other.

Since the rotary ring and the sleeve are connected to each other by the annular first connecting part, whereby a radially inner side region and a radially outer side region are separated from each other, a part between the rotary ring and the sleeve is sealed by the first connecting part. Therefore, it is possible to fix the rotary ring in a state where the rotary ring is positioned with respect to the sleeve and to obtain sealing performance without a separate elastic body such as rubber.

Since the fixed ring and the bellows are connected to each other by the annular second connecting part, whereby a radially inner side region and a radially outer side region are separated from each other, a part between the fixed ring and the bellows is sealed by the second connecting part. Further, since the bellows and the annular member are connected to each other by the annular third connecting part, whereby a radially inner side region and a radially outer side region are separated from each other, a part between the bellows and the annular member is sealed by the third connecting part. Therefore, it is possible to fix the fixed ring in a state where the fixed ring is positioned with respect to the annular member and to obtain sealing performance without a separate elastic body such as rubber.

The first connecting part may be an annular first welded part which fixes the rotary ring and the sleeve to each other, the second connecting part may be an annular second welded part which fixes the one end of the bellows and the fixed ring to each other, and the third connecting part may be an annular third welded part which fixes the other end of the bellows and the annular member to each other.

In this manner, annular connecting parts can be provided by welding.

Advantageous Effects of the Disclosure

As described above, according to the present disclosure, the need for an elastic body such as rubber can be eliminated.

DRAWINGS

FIG. 1 is a schematic sectional view showing a state of use of a mechanical seal according to an embodiment of the present disclosure.

DETAILED DESCRIPTION

Hereinafter, a mode for implementing the present disclosure will be described in detail by way of example of an embodiment with reference to the drawing. However, it is to be understood that dimensions, materials, shapes, relative arrangements, and the like of components described in the embodiment are not intended to limit the scope of the disclosure thereto unless otherwise specifically noted.

Embodiment

A mechanical seal according to an embodiment of the present disclosure will be described with reference to FIG.

1. FIG. 1 is a schematic sectional view showing a state of use of a mechanical seal according to an embodiment of the present disclosure. The mechanical seal has a rotationally symmetrical shape, and FIG. 1 represents a sectional view of the mechanical seal cut along a plane including a central axial line of the mechanical seal. It should be noted that, in the following description, a direction in which the central axial line of the mechanical seal (which matches a central axial line of a rotary shaft) extends will be referred to as an "axial direction".

Mechanical Seal

An overall configuration of a mechanical seal 10 will be described. The mechanical seal 10 seals an annular gap between a rotary shaft 500 and a housing 600 having a shaft hole for the rotary shaft 500. A left-side region and a right-side region in FIG. 1 are separated from each other since the annular gap between the rotary shaft 500 and the housing 600 is sealed by the mechanical seal 10. A sealed fluid is sealed in the left-side region and the right-side region is exposed to the air. Since pressure in the left side region is high, the left side in FIG. 1 will be referred to as a high pressure side (H) and the right side will be referred to as a low pressure side (L) when appropriate.

The mechanical seal 10 includes a rotary ring unit 100 which is mounted on the rotary shaft 500 and a fixed ring unit 200 which is mounted on the housing 600. When the rotary shaft 500 rotates, the rotary ring unit 100 rotates together with the rotary shaft 500, while the fixed ring unit 200 remains in a stationary state.

Rotary Ring Unit

The rotary ring unit 100 includes a metallic sleeve 120 which is fixed to the rotary shaft 500 and a metallic rotary ring 110 which is fixed to the sleeve 120. The rotary ring 110 includes a cylindrical member. The sleeve 120 includes a cylindrical small-diameter part 121, a cylindrical large-diameter part 122 which is larger in diameter than the small-diameter part 121, a tapered connecting part 123 which connects the small-diameter part 121 and the large-diameter part 122 to each other, and an outward flange part 124 which is provided at an end on the high pressure side (H) of the large-diameter part 122. The small-diameter part 121 is fixed by fitting to an outer circumferential surface of the rotary shaft 500. Accordingly, a part between the sleeve 120 and the rotary shaft 500 is sealed.

The rotary ring 110 is fixed to the outward flange part 124 of the sleeve 120 by an annular first welded part Y1 as an annular first connecting part. For example, the annular first welded part Y1 can be formed by welding using a laser to bond the rotary ring 110 and the outward flange part 124 to each other. It should be noted that the first welded part Y1 may not be provided over entire contact surfaces between the rotary ring 110 and the outward flange part 124. For example, the first welded part Y1 may be provided over an entire circumference near a radially outer side in the contact surfaces. The first welded part Y1 connects the rotary ring 110 and the outward flange part 124 of the sleeve 120, whereby a radially inner side region and a radially outer side region are separated from each other. Alternatively, the rotary ring 110 and the sleeve 120 can be integrally formed by making the rotary ring 110 and the sleeve 120 of a same metal material. Even in this case, it can be said that the annular first connecting part is being provided.

Fixed Ring Unit

The fixed ring unit 200 includes a metallic fixed ring 210 configured to slide on an end surface of the rotary ring 110. The fixed ring 210 includes an annular protrusion 211 which protrudes toward the rotary ring 110. When the rotary shaft 500 rotates, a distal end surface of the protrusion 211 and an end surface of the rotary ring 110 on a side of the fixed ring 210 slide on each other.

The fixed ring unit 200 includes a metallic cartridge (annular member) 220 for configuring the mechanical seal 10 as a cartridge. The cartridge 220 includes a cylinder part 221 which is fitted and fixed to an inner circumferential surface of the shaft hole of the housing 600, an outward flange part 222 which is provided at an end on the high pressure side (H) of the cylinder part 221, and an inward flange part 223 which is provided at an end on the low pressure side (L) of the cylinder part 221. The mechanical seal 10 can be positioned with respect to the housing 600 by press fitting the cartridge 220 into the shaft hole of the housing 600 until the outward flange part 222 abuts against an end surface of the housing 600. A part between the shaft hole of the housing 600 and the cartridge 220 is sealed by press fitting an outer circumferential surface of the cylinder part 221 into an inner circumferential surface of the shaft hole of the housing 600. Disengagement of the sleeve 120 and the cartridge 220 can be prevented by performing a bending process to bend a distal end of the small-diameter part 121 of the sleeve 120 radially outwardly after the various members constituting the mechanical seal 10 are assembled. This configures the mechanical seal 10 as a cartridge which can be handled as an integrated unit.

The fixed ring unit 200 has a metallic bellows 230 which presses the fixed ring 210 toward the rotary ring 110. Of the bellows 230, one end 231 is fixed to the fixed ring 210 by an annular second welded part Y2 as an annular second connecting part. The annular second welded part Y2 can be formed by welding using a laser to bond the bellows 230 and the fixed ring 210 to each other. The fixed ring 210 is provided with an annular projection 212. The second welded part Y2 is formed along a contact portion between the annular projection 212 and the one end 231 of the bellows 230. The one end of the bellows 230 and the fixed ring 210 are connected to each other by the second welded part Y2, whereby a radially inner side region and a radially outer side region are separated from each other. Alternatively, the fixed ring 210 and the bellows 230 can be integrally formed by making the fixed ring 210 and the bellows 230 of a same metal material. Even in this case, it can be said that the annular second connecting part is being provided. Of the bellows 230, another end 232 is fixed to the inward flange part 223 of the cartridge 220 by an annular third welded part Y3 as an annular third connecting part. The annular third welded part Y3 can be formed by welding using a laser to bond the bellows 230 and the cartridge 220 to each other. The inward flange part 223 of the cartridge 220 is provided with an annular projection 223a. The third welded part Y3 is formed along a contact portion between the annular projection 223a and the other end 232 of the bellows 230. The other end of the bellows 230 and the cartridge 220 are connected to each other by the third welded part Y3, whereby a radially inner side region and a radially outer side region are separated from each other. Alternatively, the bellows 230 and the cartridge 220 can be integrally formed by making the bellows 230 and the cartridge 220 of a same metal material. Even in this case, it can be said that the annular third connecting part is being provided. Alternatively, the fixed ring 210, the bellows 230, and the cartridge 220 can be integrally formed by making the fixed ring 210, the bellows 230, and the cartridge 220 of a same metal material.

In a state where the mechanical seal 10 is installed in the rotary shaft 500 and the housing 600, the bellows 230 enters a compressed state. Accordingly, the fixed ring 210 is pressed toward the high pressure side (H) by a spring force of the bellows 230. Thus, the fixed ring 210 is pressed toward the rotary ring 110 by the bellows 230. The bellows 230 has a function as a seal which separates an outer circumferential surface side of the bellows 230 from an inner circumferential surface side of the bellows 230.

Advantages of Mechanical Seal According to Present Embodiment

Since the rotary ring 110 and the sleeve 120 of the mechanical seal 10 are fixed to each other by the annular first welded part Y1, a part between the rotary ring 110 and the sleeve 120 is sealed by the first welded part Y1. Therefore, it is possible to fix the rotary ring 110 in a state where the rotary ring 110 is positioned with respect to the sleeve 120 and to obtain sealing performance without a separate elastic body such as rubber.

In addition, since the fixed ring 210 and the bellows 230 are fixed to each other by the annular second welded part Y2, a part between the fixed ring 210 and the bellows 230 is sealed by the second welded part Y2. Further, since the bellows 230 and the cartridge 220 are fixed to each other by the annular third welded part Y3, a part between the bellows 230 and the cartridge 220 is sealed by the third welded part Y3. Therefore, it is possible to fix the fixed ring 210 in a state where the fixed ring 210 is positioned with respect to the cartridge 220 and to obtain sealing performance without a separate elastic body such as rubber.

As described above, the mechanical seal 10 according to the present embodiment eliminates the need for an elastic body such as rubber.

REFERENCE SIGNS LIST

10 Mechanical seal
100 Rotary ring unit
110 Rotary ring
120 Sleeve
121 Small-diameter part
122 Large-diameter part
123 Connecting part
124 Outward flange part
200 Fixed ring unit
210 Fixed ring
211 Protrusion
212 Annular projection
220 Cartridge
221 Cylinder part
222 Outward flange part
223 Inward flange part
223a Annular projection
230 Bellows
231 One end
232 Another end
500 Rotary shaft
600 Housing
Y1 First welded part
Y2 Second welded part
Y3 Third welded part

The invention claimed is:

1. A mechanical seal for sealing an annular gap between a rotary shaft and a housing having a shaft hole into which the rotary shaft is to be inserted,
the mechanical seal comprising:
a metallic sleeve for fixing to the rotary shaft;
a one-piece metallic rotary ring fixed to the sleeve;
a metallic annular member for fixing to the housing;
a one-piece metallic fixed ring configured to slide on an end surface of the one-piece metallic rotary ring; and
an annular metallic bellows pressing the one-piece metallic fixed ring toward the one-piece metallic rotary ring and having a plurality of annular undulations that overlap one another in an axial direction relative to the rotary shaft,
wherein:
the one-piece metallic rotary ring and the sleeve are directly connected to each other by an annular first welded part, whereby a radially inner side region of the one-piece metallic rotary ring and a radially outer side region of the one-piece metallic rotary ring are separated from each other,
one axial end of the bellows is directly connected to the fixed ring by an annular second welded part, whereby a radially inner side region of the fixed ring and a radially outer side region of the fixed ring are separated from each other,
another axial end of the bellows is directly connected to the annular member by an annular third welded part, whereby a radially inner side region of the bellows and a radially outer side region of the bellows are separated from each other,
the annular member has a radially inwardly extending flange part to which the other end of the bellows is fixed by welding,
the sleeve has a cylindrical part that is configured to be fixed to the rotary shaft, and
a distal end of the cylindrical part of the sleeve is bent radially outwardly toward the inward flange part to prevent disengagement of the sleeve and the annular member.

2. A mechanical seal for sealing an annular gap between a rotary shaft and a housing having a shaft hole into which the rotary shaft is to be inserted,
the mechanical seal comprising:
a metallic sleeve for fixing to the rotary shaft;
a one-piece metallic rotary ring fixed to the sleeve;
a metallic annular member for fixing to the housing;
a one-piece metallic fixed ring configured to slide on an end surface of the one-piece metallic rotary ring; and
an annular metallic bellows pressing the one-piece metallic fixed ring toward the one-piece metallic rotary ring and having a plurality of annular undulations that overlap one another in an axial direction relative to the rotary shaft,
wherein:
the one-piece metallic rotary ring and the sleeve are directly connected to each other by an annular first welded part, whereby a radially inner side region of the one-piece metallic rotary ring and a radially outer side region of the one-piece metallic rotary ring are separated from each other,
one axial end of the bellows is directly connected to a projection of the fixed ring by an annular second welded part, whereby a radially inner side region of the fixed ring and a radially outer side region of the fixed ring are separated from each other, another axial end of the bellows is directly connected to a projection of the annular member by an annular third welded part, whereby a radially inner side region of the bellows and a radially outer side region of the bellows are separated from each other, the annular member has a radially inwardly extending flange part to which the other end of the bellows is fixed by welding, the sleeve has a cylindrical part that is configured to be fixed to the rotary shaft, and a distal end of the cylindrical part of the sleeve is bent radially outwardly toward the inward flange part to prevent disengagement of the sleeve and the annular member.

\* \* \* \* \*